(12) United States Patent
Samuel et al.

(10) Patent No.: US 9,078,178 B2
(45) Date of Patent: Jul. 7, 2015

(54) HANDOVER CONTROL

(75) Inventors: Louis Gwyn Samuel, Dublin (IE); Holger Claussen, Straffan (IE); Lester T. W. Ho, Blanchardstown (IE); Malek Shahid, Chippenham (GB)

(73) Assignee: Alcatel Lucent, Boulogne-Billancourt (FR)

( * ) Notice: Subject to any disclaimer, the term of this patent is extended or adjusted under 35 U.S.C. 154(b) by 444 days.

(21) Appl. No.: 13/514,423

(22) PCT Filed: Dec. 1, 2010

(86) PCT No.: PCT/EP2010/007286
§ 371 (c)(1), (2), (4) Date: Aug. 13, 2012

(87) PCT Pub. No.: WO2011/069612
PCT Pub. Date: Jun. 16, 2011

(65) Prior Publication Data
US 2012/0322452 A1     Dec. 20, 2012

(30) Foreign Application Priority Data
Dec. 7, 2009 (EP) ..................... 09360052

(51) Int. Cl.
*H04W 36/00* (2009.01)
*H04W 84/04* (2009.01)
*H04W 36/32* (2009.01)

(52) U.S. Cl.
CPC ...... *H04W 36/0083* (2013.01); *H04W 36/0055* (2013.01); *H04W 84/045* (2013.01); *H04W 36/32* (2013.01)

(58) Field of Classification Search
CPC .................. H04W 36/0083; H04W 36/0055; H04W 84/045; H04W 36/32
USPC ................. 455/432.1–444; 370/331–338
See application file for complete search history.

(56) References Cited

U.S. PATENT DOCUMENTS

| 8,478,273 B2 * | 7/2013 | Martin ................... 455/436 |
| 8,639,243 B2 * | 1/2014 | Radulescu et al. ............ 455/434 |

(Continued)

FOREIGN PATENT DOCUMENTS

| EP | 0 504 122 A2 | 9/1992 |
| GB | 2 452 797 A | 3/2009 |
| WO | WO 2008/088592 A1 | 7/2008 |

OTHER PUBLICATIONS

International Search Report for PCT/EP2010/007286 dated Mar. 30, 2011.

(Continued)

*Primary Examiner* — Sharad Rampuria
(74) *Attorney, Agent, or Firm* — Fay Sharpe LLP

(57) ABSTRACT

A method of identifying femto base station handover targets for user equipment in a wireless telecommunications network, a femto gateway operable to execute that method and a computer program product. The method comprises the steps of: receiving an indication of user equipment entry into a geographical area served by a femto base station; storing user equipment entry information, generated from said received indication of user equipment entry; receiving an indicator from user equipment identifying a detected femto base station as a handover target; and correlating said indicator against said user equipment entry information to identify those femto base stations having entered user equipment as handover targets.

20 Claims, 8 Drawing Sheets

(56) References Cited

U.S. PATENT DOCUMENTS

| | | | |
|---|---|---|---|
| 8,712,415 B2* | 4/2014 | Zhang et al. | 455/436 |
| 8,825,051 B2* | 9/2014 | Tinnakornsrisuphap et al. | 455/436 |
| 2008/0132239 A1 | 6/2008 | Khetawat et al. | |
| 2008/0305801 A1 | 12/2008 | Burgess et al. | |
| 2009/0129341 A1 | 5/2009 | Srinivasan et al. | |
| 2010/0093351 A1* | 4/2010 | Barrett et al. | 455/436 |
| 2012/0094666 A1* | 4/2012 | Awoniyi et al. | 455/435.1 |

OTHER PUBLICATIONS

European Patent App. No. 09360052, Extended European Search Report, mailed Sep. 8, 2010, 15 pp.

European Patent App. No. 09360052, Partial European Search Report, mailed Jun. 2, 2010, 6 pp.

PCT Patent App. No. PCT/EP2010/007286, Written Opinion of the International Searching Authority, mailed Mar. 30, 2011, 14 pp.

* cited by examiner

HANDOVER CONTROL

FIELD OF THE INVENTION

The present invention relates to a method of identifying femto base station handover targets for user equipment in a wireless communications network, a computer program product, a femto base station gateway, a method of identifying entry of user equipment into a geographical area served by a femto base station, a computer program product and a femto base station.

BACKGROUND

Wireless telecommunications networks are known. In a cellular system radio coverage is provided by regions of geographical area. Those regions are known as cells. A base station is located in each cell to provide the radio coverage. Traditional base stations provide coverage in relatively large geographical areas and the cells are often referred to as macro cells. It is possible to provide smaller sized cells within a macro cell. Cells that are smaller than macro cells are sometimes referred to as micro cells, pico cells, or femto cells. However, throughout this document the term femto cell is used generically for cells that are smaller than macro cells. One way to establish a femto cell (sometimes referred to as a home cell) is to provide a femto base station (or home base station) that provides coverage having a relatively limited range within the coverage area of a macro cell. The transmission power of a femto base station is relatively low and, hence, each femto cell provides a small coverage area compared to that of a macro cell and covers, for example, an office or a home.

Such femto cells may be provided where the communications coverage provided by the macro cell is poor or where a user wishes to use an alternative communications link provided locally, by the femto base station, to communicate with the core network. Such a situation might arise where, for example, a user has a pre-existing communications link and the user wishes to utilise that link in preference to that provided by a macro cell network provider to communicate with the core network.

In order to maintain a high level of service to an end user, with minimal service interruption, it may be necessary to handover the user equipment from the macro cell within which it is located to a femto base station. Likewise, it may be necessary to handover the user equipment from one femto base station to another. However, there may be typically tens of thousands of femto base stations which may be deployed within a network under one controller. This presents a problem of identifying which femto base station to handover the user equipment to.

Accordingly, it is desired to provide an improved technique to enable handover to occur efficiently.

SUMMARY

A first aspect provides a method of identifying femto base station handover targets for user equipment in a wireless telecommunications network, the method comprising the steps of:
receiving an indication of user equipment entry into a geographical area served by a femto base station;
storing user equipment entry information, generated from the received indication of user equipment entry;
receiving an indicator from user equipment identifying a detected femto base station as a handover target; and
correlating the indicator against the user equipment entry information to identify those femto base stations having entered user equipment as handover targets.

The first aspect recognises that one problem with the deployment of femto cells is that the number of primary scrambling codes which can be allocated to the femto base stations is limited and, typically, will be between 6 and 16 different available primary scrambling codes. The selection of a primary scrambling code will typically be auto-configured by the femto base stations themselves, based on measurements of other primary scrambling codes used in their vicinity. Therefore, in a typical femto cell deployment, these primary scrambling codes will need to be heavily reused and this presents a problem for the handover of a call from the macro base station to a femto base station or between femto base stations, as will now be explained in more detail. As the user equipment notices that the quality of its established signal degrades, the user equipment may search for other base stations and may generate a measurement report indicating that a neighbouring femto base station provides a much better quality signal and is therefore a potential handover target. There will be the need, therefore, to attempt to communicate with the target femto base station via the core network to indicate that handover to that target femto base station is required. The measurement report may include a distinguishing characteristic of the femto base station handover target, such as its primary scrambling code, to help identify it. However, it is likely that as the number of femto base stations increases, the number of femto base stations having the same distinguishing characteristics increases, each of which would therefore need to be prepared as a potential handover target. However, it will be appreciated that such an approach is extremely wasteful of resources and may soon become unmanageable as the number of deployed femto base stations and user equipment increases.

By identifying those femto base stations which have reported a user equipment entry event and cross-correlating that information with the distinguishing characteristic provided by the user equipment measurement report it is possible to significantly reduce the number of femto base stations to which signalling will be sent in order to prepare them as a potential handover target. It may, for example, be possible to reduce the number of femto base stations to which signalling will be sent to a single unique femto base station.

In one embodiment, the indicator from user equipment comprises a primary scrambling code and the method further comprises the step of:
identifying a set of femto base stations comprising a virtual cell corresponding to the primary scrambling code. Accordingly, it will be understood that use of the primary scrambling code identified by user equipment allows re-use of existing network functionality.

In one embodiment, the indication of user equipment entry comprises an indication of increased radio noise floor detected by a femto base station.

When active user equipment enters a geographical region served by a femto base station, the radio condition experienced by the user equipment and femto base station experiences various changes. It will be understood that, for example, the likelihood of perceived radio interference will increase. An increase in interference is likely to lead to an increase in radio noise floor detected by a femto base station.

In one embodiment, the indication of user equipment entry comprises an indication from user equipment of increased error rate in transmitted data. It will be understood that any measurable characteristic indicative of interference including, for example, block error rate, bit error rate, or a decrease in signal to noise ratio, may be used to identify possible entry of active user equipment into an area served by a femto base station.

In one embodiment, the indication of user equipment entry comprises an indication from user equipment of increased received femto base station broadcast channel signal strength.

As user equipment approaches a femto base station, it will be understood that the strength of a received broadcast signal from that femto base station will increase. It is possible to use that increase as an indicator of user equipment entry to a femto cell.

In one embodiment, the stored user equipment entry information comprises a list of those femto base stations reporting user equipment entry.

In one embodiment, the steps of:
receiving an indication of user equipment entry into a geographical area served by a femto base station; and
storing user equipment entry information, generated from the received indication of user equipment entry;
are periodically repeated.

Periodically repeating those steps allows changes in the network to be detected. A flag set to indicate recent entry of user equipment into a femto cell may be updated when user equipment is no longer detected to have recently entered a femto cell. It will be understood that, in determining targets for active handover, only recent occurrences of user equipment entry have particular relevance. Periodic repetition of those steps listed above may allow the stored user equipment entry information to be updated to reflect only those femto base stations recently reporting user equipment entry.

In one embodiment, the method further comprises the step of:
transmitting a handover prepare message to those femto base stations identified as handover targets. Accordingly, once a set of handover targets has been identified, a handover prepare message may be sent only to those identified handover targets, thereby minimising unnecessary signalling across the network.

A second aspect provides a computer program product operable, when executed on a computer, to perform the method steps of the first aspect.

A third aspect provides a femto gateway operable to identify femto base station handover targets for user equipment in a wireless telecommunications network, the femto gateway comprising:
user equipment entry reception logic operable to receive an indication of user equipment entry into a geographical area served by a femto base station;
user equipment entry storage logic operable to store user equipment entry information, generated from the received indications of user equipment entry;
handover target reception logic operable to receive an indicator from user equipment identifying a detected femto base station as a handover target; and
handover correlation logic operable to correlate the indicator against the user equipment entry information to identify those femto base stations having entered user equipment as handover targets.

In one embodiment, the indicator from user equipment comprises a primary scrambling code and the handover target reception logic is further operable to identify a set of femto base stations comprising a virtual cell corresponding to the primary scrambling code.

In one embodiment, the indication of user equipment entry comprises an indication of increased radio noise floor detected by a femto base station.

In one embodiment, the indication of user equipment entry comprises an indication from user equipment of increased error rate in transmitted data.

In one embodiment, the indication of user equipment entry comprises an indication from user equipment of increased received femto base station broadcast channel signal strength.

In one embodiment, the stored user equipment entry information comprises a list of those femto base stations reporting user equipment entry.

In one embodiment, the femto gateway further comprises repetition logic operable to repeat the steps of:
receiving an indication of user equipment entry into a geographical area served by a femto base station; and
storing user equipment entry information, generated from the received indication of user equipment entry.

In one embodiment, the femto gateway further comprises:
transmission logic, operable to transmit a handover prepare message to those femto base stations identified as handover targets.

A fourth aspect provides a method of identifying entry of user equipment into a geographical area served by a femto base station to a femto gateway in a wireless telecommunications network, said method comprising the steps of:
receiving an indication of a measurable characteristic representative of ambient radio condition between said femto base station and said user equipment;
receiving an indication of a measurable characteristic representative of current radio condition between said femto base station and said user equipment;
comparing said indication of current radio condition to said indication of ambient radio condition to determine whether a predetermined user equipment entry condition has been met; and
transmitting an indication of user equipment entry to said femto gateway if said user equipment entry trigger condition has been met.

The fourth aspect recognises that the radio condition between a femto base station and user equipment can most sensibly be measured by either one of the user equipment and base station. In particular, the base station is likely to be operable to detect and measure various characteristics indicative of the radio condition experienced between user equipment and the base station. By constantly monitoring and/or calculating an ambient radio condition changes to that radio condition may be effectively monitored. It will therefore be understood that when active user equipment enter the region served by a femto base station the radio condition experienced by both user equipment and femto base station will change. The change which is consequent upon entry may be used to identify entry of user equipment into a femto cell, provided suitable trigger criteria are set. It will be appreciated that the trigger condition may relate to net value of a measurable characteristic or may relate to time derivatives of a measured value such as a measured rate of change. Furthermore, the trigger conditions may be based upon a combination of net and derivative values being met. It will be appreciated that the threshold trigger condition must be set low enough that a femto base station can notify a gateway of potential user equipment entry before a macro system initiates handover but that same threshold must not be too low thereby preventing too many false positives.

In one embodiment the characteristic of radio condition comprises an indication of radio noise floor detected by the femto base station.

An active mobile terminal entering a geographical coverage area of a femto base station operating on the same frequency as the macro cell will be seen by the femto base station as a new interfering source that effectively increases the noise floor of the femto cell. Because of the nature of femto cells such arise in noise floor is likely to persist if a user intends to use the femto base station. A femto base station can therefore be operable to set trigger points based on noise floor rise and thereby signal to the macro system the increase in likelihood of a handover event.

The technique can be extended to a non-co-channel case in which the macro frequency is different to the femto overlay carrier frequency) such an arrangement simply requires that the femto base station has knowledge of the macro underlay frequency. That information can be provided and kept updated during a femto base station auto-configuration process. A base station must then have the capability to perform measurements of the underlay frequencies noise floor for example by using a sniffer capability at the femto cell. It will be further appreciated that other measurable characteristics indicative of interference may be used instead of measured noise floor for example, it may be possible to use bit or block error rate or a decrease in signal to noise ratio. It may also be possible to use received broadcast channel signal strength as an indicator of user equipment entry to a femto cell. It will be appreciated that as user equipment becomes closer to a femto base station the strength of signal received is likely to increase.

In one embodiment, the step of receiving an indication characteristic of ambient radio condition further comprises the steps of:
periodically receiving an indication representative of current radio condition; storing a series of indications representative of current radio condition; and
calculating the indication characteristic of ambient radio condition from the series of said indications representative of current radio condition.

Accordingly, a femto base station may be operable to calculate ambient radio condition by monitoring current radio condition over a series of time intervals. Such averaging ensures that the ambient radio condition is accurately represented.

In one embodiment, the steps of:
receiving an indication of a measurable characteristic representative of ambient radio condition between the femto base station and the user equipment;
receiving an indication of a measurable characteristic representative of current radio condition between the femto base station and the user equipment; and
comparing the indication of current radio condition to the indication of ambient radio condition to determine whether a predetermined user equipment entry condition has been met, are periodically repeated.

Periodically repeating those steps ensures that subsequent entry of further user equipment is duly notified to a femto gateway. Furthermore, it ensures that once active user equipment has entered a region served by a femto base station the ambient radio condition is recalculated and that the most relevant information is sent to a femto gateway.

In one embodiment, the method further comprises the step of:
transmitting an indication of non-user equipment entry to the femto gateway if the user equipment entry trigger condition has not been met.

Accordingly, flags set at a femto gateway may be cleared in an active manner rather than being timed out by actions taken at the femto gateway itself.

A fifth aspect provides a computer program product operable, when executed on a computer, to perform the method steps of the fourth aspect.

A sixth aspect provides a femto base station operable to identify entry of user equipment into a geographical area served by a femto base station to a femto gateway in a wireless telecommunications network, the femto base station comprising:
   ambient radio condition reception logic operable to receive an indication of a measurable characteristic representative of ambient radio condition between the femto base station and the user equipment;
   current radio condition reception logic operable to receive an indication of a measurable characteristic representative of current radio condition between the femto base station and the user equipment;
   radio condition comparison logic operable to compare the indication of current radio condition to the indication of ambient radio condition to determine whether a predetermined user equipment entry condition has been met; and
   transmission logic operable to transmit an indication of user equipment entry to the femto gateway if said user equipment entry trigger condition has been met.

In one embodiment, the characteristic of radio condition comprises an indication of radio noise floor detected by the femto base station.

In one embodiment, the ambient radio condition logic is further operable to:
periodically receive an indication representative of current radio condition; store a series of the indications representative of current radio condition; and calculate the indication characteristic of ambient radio condition from the series of indications representative of current radio condition.

In one embodiment, the femto base station further comprises repetition logic operable to periodically repeat the steps of:
   receiving an indication of a measurable characteristic representative of ambient radio condition between the femto base station and the user equipment;
   receiving an indication of a measurable characteristic representative of current radio condition between the femto base station and the user equipment; and
   comparing the indication of current radio condition to said indication of ambient radio condition to determine whether a predetermined user equipment entry condition has been met.

In one embodiment, the transmission logic is further operable to transmit an indication of non-user equipment entry to the femto gateway if the user equipment entry trigger condition has not been met.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
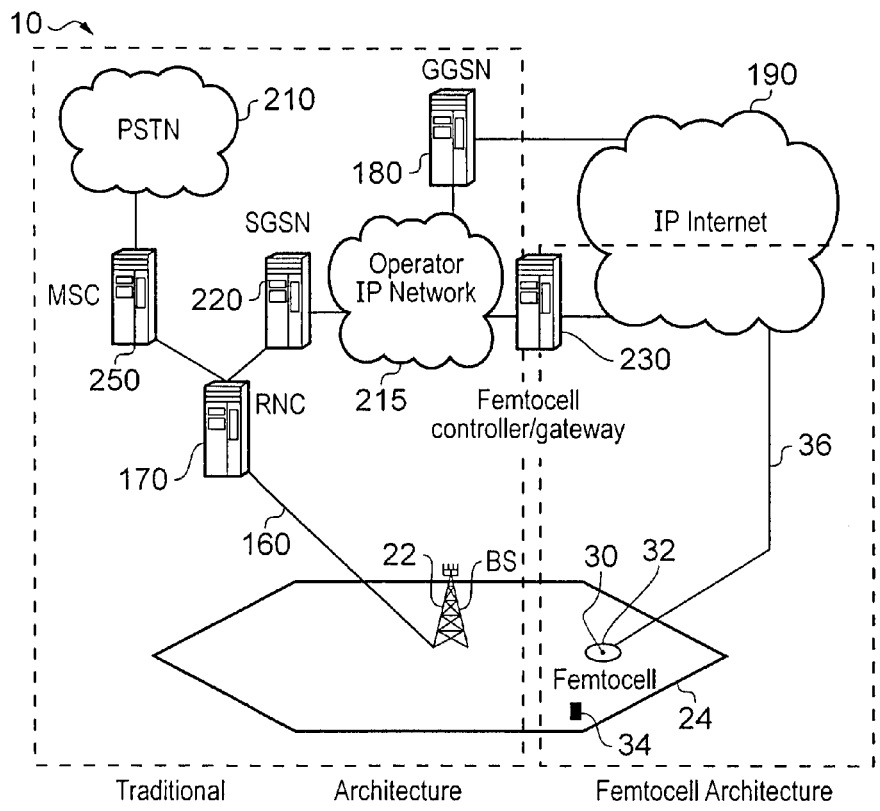
FIG. 1 illustrates the main components of a telecommunications network according to one embodiment.

FIG. 1 illustrates a wireless communication network, generally 10, according to one embodiment. User equipment 34 roam through the wireless communication network 10. Base stations 22 are provided which support respective macro cells 24. A number of such base stations are provided, which are distributed geographically in order to provide a wide area of coverage to the user equipment 34. When user equipment 34 is within a macro cell 24 supported by the base station 22 then communications may be established between the user equipment 34 and the base station 22 over an associated radio link. Each base station typically supports a number of sectors. Typically, a different antenna within a base station supports an associated sector. Accordingly, each base station has multiple antennas and signals sent through the different antennas are electronically weighted to provide a sectorised approach. It will be appreciated that FIG. 1 illustrates a small subset of the total number of user equipment and base stations that may be present in a typical communications system.

The operation of a cluster of base stations is managed by a radio network controller 170. The radio network controller 170 controls the operation of the wireless communications network 10 by communicating with the base stations 22 over a backhaul communications link 160. The network controller 170 also communicates with the user equipment 34 via their respective radio links in order to efficiently manage the wireless communication network 10.

The radio network controller 170 maintains a neighbour list which includes information about the geographical relationship between cells supported by base stations. In addition, the radio network controller 170 maintains location information which provides information on the location of the user equipment within the wireless communications network 10. The radio network controller 170 is operable to route traffic via circuit-switched and packet-switched networks. Hence, a mobile switching centre 250 is provided with which the radio network controller 170 may communicate. The mobile switching centre 250 then communicates with a circuit-switched network such as a public switched telephone network (PSTN) 210. Likewise, the network controller 170 communicates via an operator IP network 215 with serving general packet radio service support nodes (SGSNs) 220 and a gateway general packet radio support node (GGSN) 180. The GGSN then communicates with a packet-switch core 190 such as, for example, the Internet.

Figure 2:
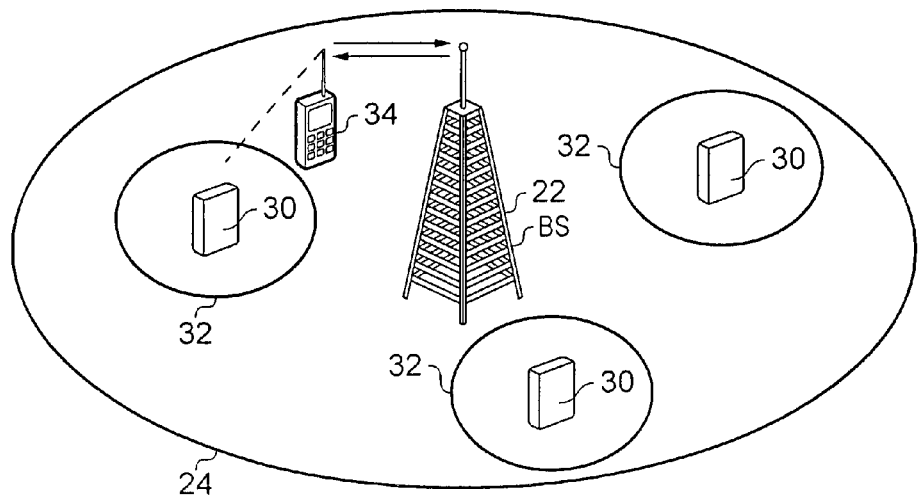
FIG. 2 illustrates a general deployment within one macro cell shown in FIG. 1.

As shown in more detail in FIG. 2, there are provided a number of femto cell base stations 30 (sometimes referred to as home base stations), each of which provides a femto cell 32 (or home cell) in the vicinity of a building within which the associated femto cell base station is installed. The femto cells 32 provide local communications coverage for a user in the vicinity of those buildings. Each femto cell base station 30 communicates with the network 10 via a femto cell controller/gateway 230. A handover or camping event is initiated between the base station 22 and the femto cell base stations 30 when the user equipment 34 provides a measurement report to the macro base station 22 which indicates that a femto base station 30 is within range. The femto cell base stations 30 typically utilise the user's broadband Internet connection 36 (such as ADSL, Cable, Ethernet, etc.) as a backhaul.

Femto cell base stations 30 are lower-power, low-cost, user-deployed base stations that provide a high cellular quality of service in residential or enterprise environment these femto base stations can provide the functionality of RNCs, SGSNs, GGSNs and MSCs. In contrast to current macro cell approaches where complex and highly reliable base stations are deployed to strategic locations decided by the network owner, the femto cell base stations 30 are provided locally by customers. Such femto cell base stations 30 provide local coverage in areas of the macro network where quality of service may be low. Hence, the femto cell base stations 30 provide for improved quality of service in areas which are difficult for network operators. To reduce the cost of the femto base stations 30 and to reduce complexity and interference effects of the femto cell 32 on other user equipment within the macro cell, the transmission power of the femto cell base station 30 is relatively low in order to restrict the size of the femto cell 32 to a range of tens of meters or less. The femto cell base stations 30 have extensive auto-configuration and self-optimisation capability to enable a simple plug-and-play deployment. As such, they are designed to automatically integrate themselves into an existing macro cellular wireless network 10. In addition, some access point within the macro cellular network contains some functionality traditionally provided by the core network.

Each femto base station 30 will typically have functionality to control which user equipment 34 may access to that femto base station 30. A closed access femto base station will only allow access to those user equipment who have been indicated (for example using the user equipment's International Mobile Subscriber Identity (IMSI)) as being registered with that femto base station, whereas an open access femto base station allows access to all user equipment.

The number of primary scrambling codes which can be allocated to a femto base station 30 is limited. In many implementations, the number of available primary scrambling codes will be less than 20 and most typically will be between 6 and 16. However, the total number of available primary scrambling codes will vary from implementation to implementation and may be more or less than these illustrative numbers. These primary scrambling codes typically are auto-configured by the femto base stations 30 based on measurements of surrounding primary scrambling codes used. Therefore, in typical femto base station deployments, the primary scrambling codes may need to be heavily reused which means that many femto base stations 30 may be using the same primary scrambling code within a macro cell 24 coverage area.

Before describing the embodiments in any more detail, a brief overview will now be provided. When performing a handover to a femto base station 30, it is necessary to try to identify that target femto base station (the base station to which the user equipment needs to be handed off to) as accurately as possible. In an ideal implementation, each femto base station 30 would be uniquely identifiable. However, even it were possible to uniquely identify every femto base station 30 deployed in the network 10, currently no provision exists to enable user equipment 34 to detect such unique identifications or to communicate that information through the network 10 back to the femto controller/gateway 230 (which acts as the radio network controller for the femto base stations) to enable the handover to occur. Accordingly, the existing functionality of the user equipment 34, macro base stations 22 and intervening infrastructure to the femto controller/gateway 230 needs to be utilised in a way that enables the target femto base station to be identified.

However, various existing functionality exists in both 2G and 3G networks which can be enhanced to help identify and facilitate the handover to a target femto base station 30. This enhanced functionality utilises signalling information which indicates when user equipment 34 is attached to femto base stations 30 within the network 10.

It will be understood that femto base stations act to create a sub-layer of coverage within the existing macro cell layer.

In a typical network 10 user equipment receives a signal from base stations (both macro and femto) including an indication of the PSC of each base station. The PSC is utilised by user equipment to identify candidate cells for handover or mobility purposes, since the relative strength of a pilot signal including said PSC received from each base station is utilised to create the list of candidate cells. The PSC reported back to an RNC by user equipment is also used as a shorthand by the RNC to identify a cell within the same domain as other cells controlled by the same radio controller. Typically user equipment is operable to report back a received scrambling code to the RNC, rather than to decode a received broadcast channel in its entirety. Reporting back a simple PSC enables some level of preservation of the battery life of user equipment.

It will be understood that there may be many femto cells located within a geographical area served by one macro cell 24. This gives rise to a potential problem when identifying target femto cells for active handover via a scrambling code alone. The number of femto cells within the geographical domain of a macro cell may potentially be more than the range of scrambling codes that the entire system 10 has available. The problem of having sufficient numbers of scrambling codes for the sub-layer provided by femto base stations can be mitigated by segregating a restricted number of scrambling codes for femto sub-layer use. Those restricted scrambling codes may be reused among the many femto base stations providing femto cells. Using that methodology allows numerous femto cells having the same scrambling code (sometimes referred to as having the same colour) to appear as a single "virtual" cell to the macro layer.

To perform active handover of user equipment from a macro base station to a femto base station the network 10 must be operable to identify the virtual cell and pass relevant signalling procedure to each of the femto base stations making up the composition of the identified virtual cell. It will be appreciated that such an approach may lead to unnecessary duplication of signalling. In a large system of femto cells such additional signalling may cause network problems.

Utilisation of currently measured parameters by user equipment 34 and femto base stations 30 may be utilised to more intelligently choose femto base stations to signal for active handover. The network is able to increase the probability of accurately identifying a target femto cell for active handover.

In particular, femto base stations 30, supporting areas of coverage 32 are operable to measure the ambient radio noise floor in their particular geographic location. Active user equipment entering a coverage area of a femto base station 30 will be seen by the femto base station as a new radio interference source that effectively increases the measured radio noise floor of the femto cell. Since the coverage area provided by a femto cell is small and femto cells are deployed accordingly, user equipment that wishes to use the services of a femto base station is likely to be a nomadic or stationary user and the rise in radio noise floor is likely to be persist whist the user equipment remains within the femto cell. A femto base station by be operable to set trigger points based on measured radio noise floor rise. The rises in noise floor may be used to signal to the network an increased likelihood of an active handover event.

For example, if a femto base station detects a rise in noise floor it may communicate with femto gateway 230 such that the femto gateway sets a flag. If user equipment 34 enters a femto cell 32 served by a femto base station 30 it will receive a primary scrambling code from that femto base station. User equipment 34 transmits that measurement to the macro base station to which it is already attached. That base station relays the primary scrambling code to RNC 170. RNC 170 recognises that the primary scrambling code is not that of a base station in the cluster it serves. It interrogates the network 10 and "sees" that the received PSC is served by femto cell gateway 230. RNC 170 sees femto cell gateway 230 as a virtual RNC. The macro system wishing to complete an active handover sends signalling to the virtual macro cell identified by the received PSC. This signalling arrives at femto gateway 230. The femto gateway 230 may be operable to only forward the active handover signalling to those femto base stations 30 that reported a noise floor rise flag set.

It will be appreciated that in this way the uncertainty regarding target handover femto cells, and consequently multiplication in irrelevant signalling, may be mitigated.

Measured radio noise floor may be utilised by appropriate choice of threshold triggers. The thresholds must be set low enough such that the femto base station notifies the femto gateway of a potential handover before the macro system initiates an active handover procedure to a femto cell, otherwise the macro level to femto level handover would fail. At the same time it will be appreciated that threshold must not be too low or it will result in too many false positives a user equipment pass though, but do not remain in, a femto cell.

In a co-channel case, the entry of user equipment 34 to a femto cell 32 is seen as a new source of radio interference and causes a consequent rise in radio noise floor. It will be understood that the technique can be extended to a non co-channel case (i.e. the macro underlay a different carrier frequency to the femto overlay). This scenario requires that the femto base station has knowledge of the macro underlay frequency.

Such information can be provided and kept updated by the HNMS during an initial femto base station auto-configuration process. The non co-channel case also requires that the femto base station has the capability to perform measurements of the noise floor of the underlay frequency.

In one embodiment, a local rise in noise floor at a femto cell is used as an indicator to the femto gateway that there is a possibility of user equipment being handed over to it. This possibility is signalled to the femto gateway. The signalling event leads to a noise floor flag being set at the femto gateway in anticipation of an active handover signalling event message being received from the macro cellular network. It will be appreciated that any measurable characteristic indicative of user equipment entering a femto cell may be utilised in a similar manner to the rise in radio noise floor, for example, an increase in block error rate an increase in bit error rate or a rise in strength of received broadcast channel strength from a femto base station at user equipment.

It will be appreciated that as active user equipment enters a geographical region served by a femto base station 30, there is likely to be an increase in the measured noise floor.

Therefore, the femto controller/gateway 230 can employ some intelligence to determine the most likely femto base station that the user equipment 34 wishes to hand over to and, hence, can forward the handover request to that femto base station.

Accordingly, it can be seen that the number of target base stations for handover can be significantly reduced, thereby improving the likelihood that a handover will complete successfully and reducing the unnecessary use of resources to prepare base stations other than the intended handover target.

The operation of an embodiment of a femto base station for use in the telecommunications network of FIG. 1 will now be described in more detail in relation to FIGS. 3 to 5.

Figure 3:
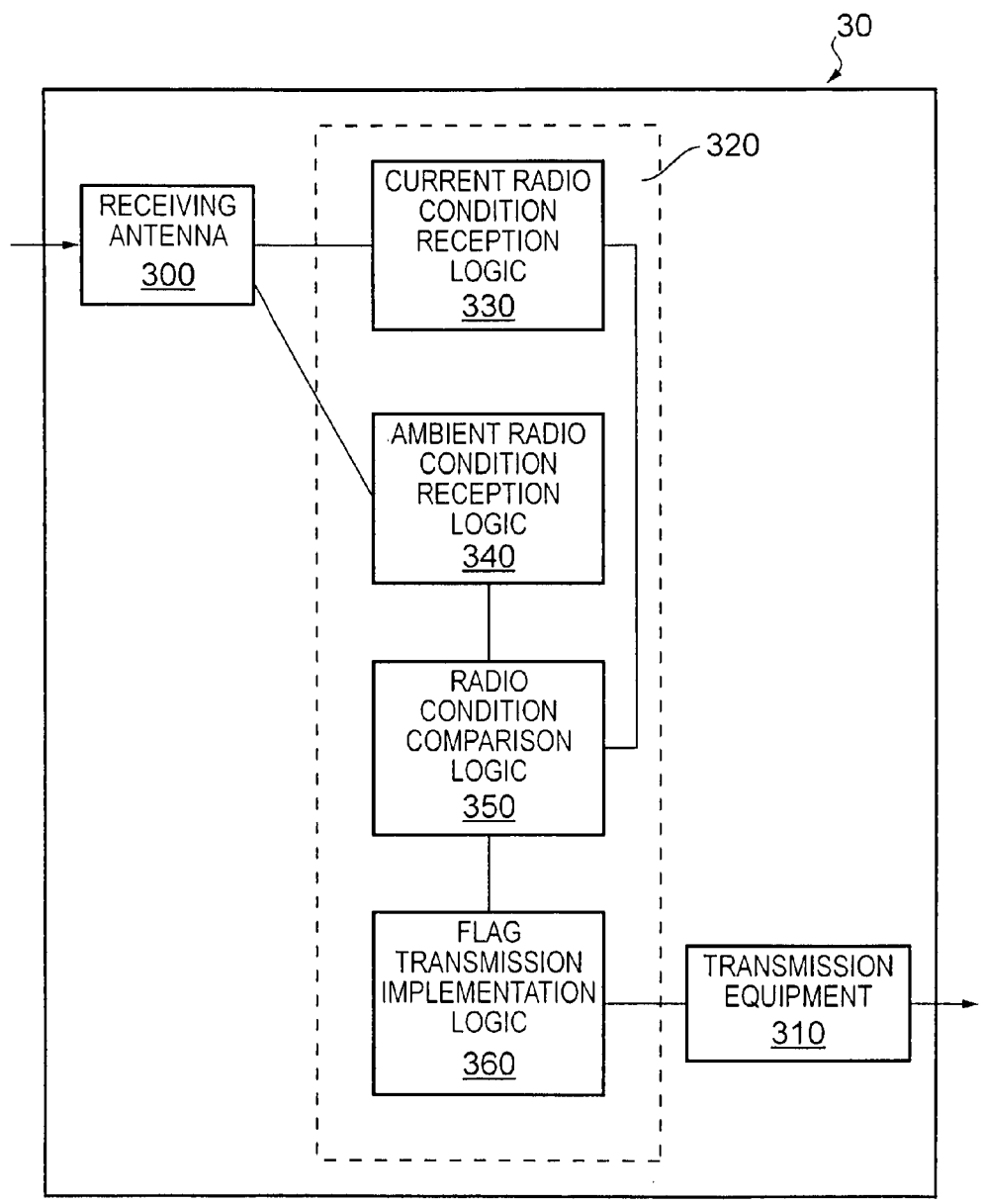
FIG. 3 illustrates schematically components of a femto base station for use in the telecommunications network of FIG. 1.

FIG. 3 illustrates schematically one embodiment of a femto base station for use in the telecommunications network of FIG. 1. The femto base station 30 of FIG. 3 comprises: a reception antenna 300, transmission equipment 310 and a femto base station controller 320. The femto base station controller 320 further comprises current radio condition reception logic 330, ambient radio condition reception logic 340, radio condition comparison logic 350 and flag transmission implementation logic 360.

The reception antenna 300 is operable to receive radio signals. The reception antenna 300 receives general radio signals but also specific radio signals from: a femto gateway 230 and from user equipment 34. The transmission equipment 310 is operable to transmit signals to user equipment 34 and to femto cell controller 230.

The reception antenna 300 is operable to communicate with current radio condition reception logic 330 and ambient radio condition reception logic 340. It will be understood that ambient radio condition reception logic 340 is operable to average current radio condition over a period of time in order to determine ambient radio condition.

Both current radio condition reception logic 330 and ambient radio condition reception logic 340 are operable to communicate with radio condition comparison logic 350. Radio condition comparison logic 350 is operable to communicate with flag transmission implementation logic 360 which, in turn, communicates with transmission antenna 310. The operation of femto base station 30 will be further described in relation to the processing steps of FIG. 4.

Figure 4:
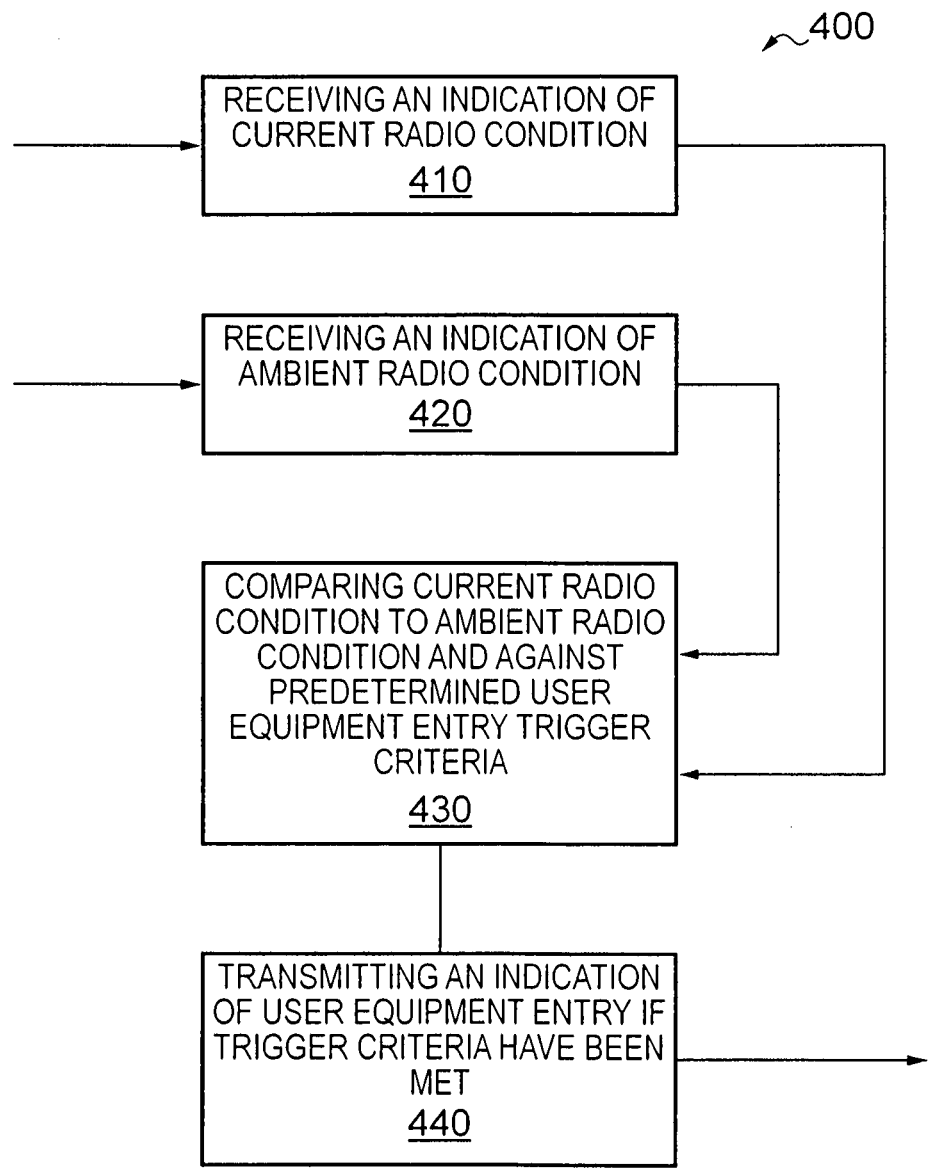
FIG. 4 illustrates the main processing steps performed by one embodiment of a femto base station for use in the telecommunications network of FIG. 1.

FIG. 4 illustrates the main processing steps of the femto base station of FIG. 3. The main processing steps of identifying user equipment entry to a geographic region severed by femto base station 30 are illustrated schematically as method 400. Current radio condition reception logic 330 is operable to receive an indication of current radio condition indicated as step 410 in method 400. Ambient radio condition reception logic 340 is operable to receive an indication of ambient radio condition, as shown as step 420 in method 400. Radio condition comparison logic 350 receives an indication of current radio condition and an indication of ambient radio condition and compares current radio condition to ambient radio condition and against a set of predetermined user equipment entry trigger criteria to determine whether user equipment is likely to have entered the geographical area served by femto base station 30. That step of comparison against predetermined criteria is illustrated by step 430 of method 400. If user equipment entry criteria are determined to have been met by radio condition comparison logic 350, femto base station 30 is operable to transmit an indication of user equipment entry to a femto gateway 230. That step of transmission of a flag indicating entry of user equipment is illustrated as step 440 in method 400 and is carried out by transmission implementation logic 360 and transmission equipment 310.

Figure 5:
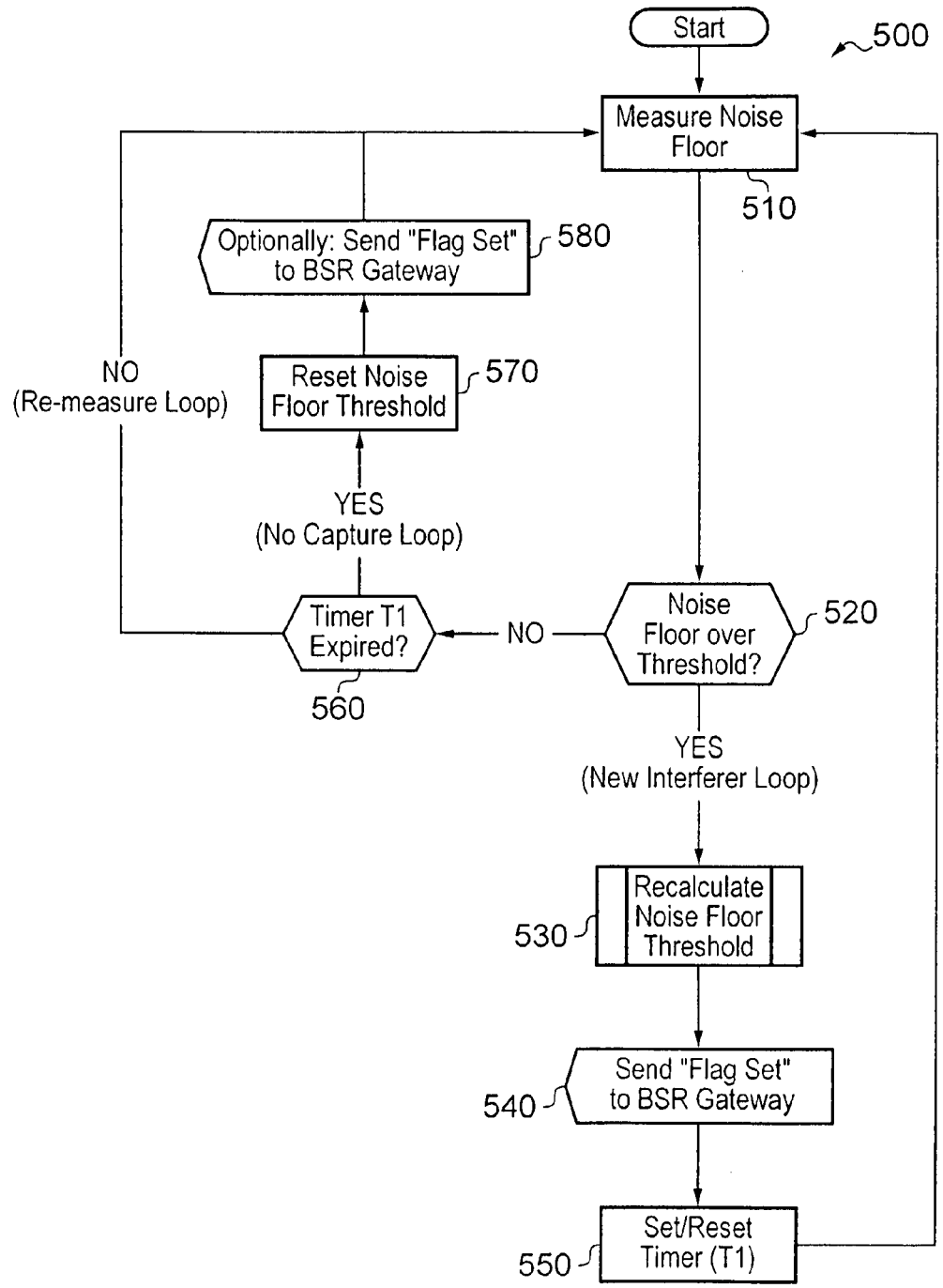
FIG. 5 illustrates a particular embodiment of processing steps performed by a femto base station for use in the telecommunications network of FIG. 1.

FIG. 5 illustrates a particular embodiment of processing steps performed by a femto base station for use in the telecommunications network of FIG. 1. The main processing steps illustrated in FIG. 5 constitute method 500 and relate to a particular embodiment base upon measurement of noise floor at femto base station 30. In this embodiment femto base station 30 is operable to measure noise floor. This step is illustrated as step 510. Femto base station then operates to determine whether the measured noise floor is over a predetermined threshold value and that step is illustrated as 520. If a base station determines that the noise floor is over the predetermined threshold, that is to say the trigger criteria have been met, it is operable to both recalculate the noise floor threshold (i.e. to recalculate ambient noise floor) as illustrated at step 530 and also to send a 'flag set' message to the femto base station gateway. That step is illustrated at step 540.

Once steps 520 to 540 have been completed, femto base station is operable to reset (or set) a timer to periodically re-measure the noise floor. The step of resetting the timer is illustrated as step 550. If, at step 520, it is determined that the measured noise floor is not over there threshold (that is to say the user equipment engine criteria have not been met), the base station is operable to check whether the timer has expired. The step of checking whether the timer has expired is illustrated at step 560. If the timer has expired, then the base station is operable to reset the noise floor threshold at step 570 and optionally to send a 'flag set' message to femto gateway 230. The optional step is illustrated as 580. If the timer has not expired at step 560, then the base station is operable to wait until the timer has expired and then re-measure the noise floor at step 510.

The operation of an embodiment of a femto gateway for use in the telecommunications network of FIG. 1 will now be described in more detail in relation to FIGS. 6-8.

Figure 6:
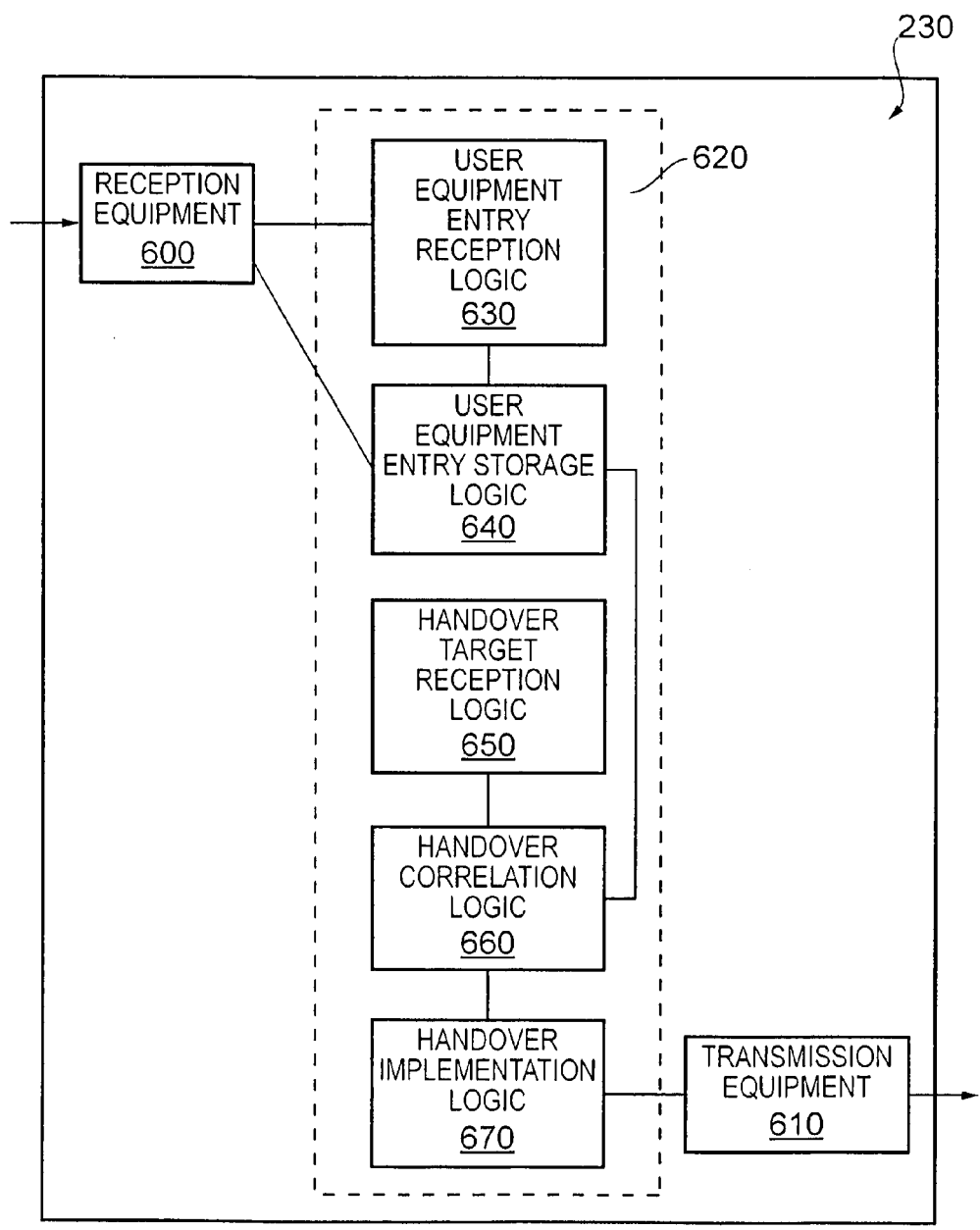
FIG. 6 illustrates schematically components of a femto gateway for use in the telecommunications network of FIG. 1.

FIG. 6 illustrates schematically one embodiment of a femto gateway to 30 for use in the telecommunications network of FIG. 1. The femto gateway of FIG. 6 comprises: reception equipment 600, transmission equipment 610 and a gateway controller 620. The femto gateway is linked to femto base stations 30.

Reception equipment 600 is operable to receive signals from the core network and also from femto base station 30. Furthermore transmission equipment 610 is operable to communicate with femto base stations 30 and also the core network.

Femto gateway controller 620 further comprises: user equipment entry reception logic 630, user equipment entry storage logic 640, handover target reception logic 650, handover correlation logic 660, and handover implementation logic 670.

The reception equipment is operable to communicate with user equipment entry reception logic 630 and handover target reception logic 650. User equipment entry reception logic 630 communicates with user equipment entry storage logic 640. User equipment entry storage logic 640 and handover target reception logic 650 are both operable to communicate with handover correlation logic 660. Handover correlation logic 660 communicates with handover implementation logic 670 which, in turn, communicates with transmission equipment 610. The operation of femto gateway 230 will be further described in relation to the processing steps of FIG. 7.

Figure 7:
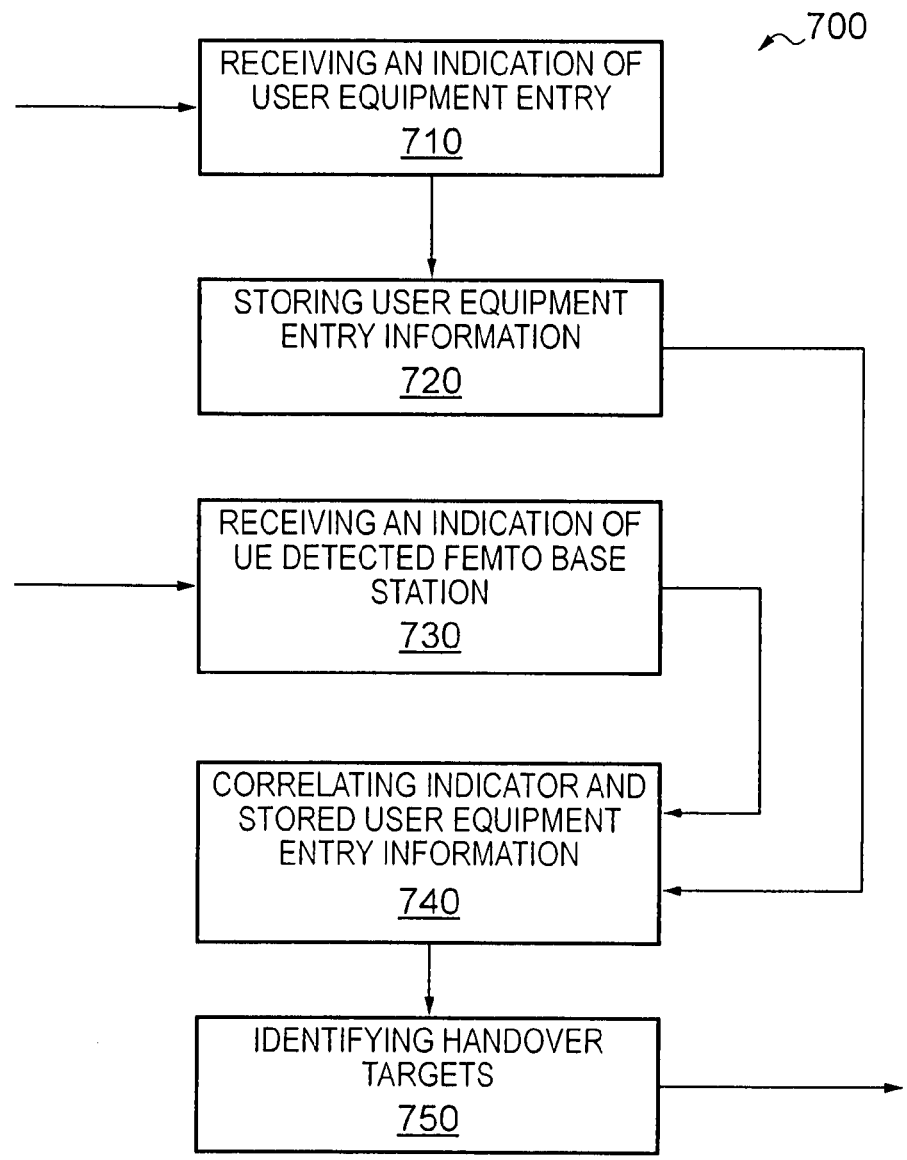
FIG. 7 illustrates the main processing steps performed by a femto gateway for use in the telecommunications network of FIG. 1.

FIG. 7 illustrates the main processing steps of femto gateway 230 as used in a telecommunications network according to FIG. 1. The main processing steps of identifying handling of the transfer targets is illustrated as method 700.

Femto gateway 230 receives an indication of user equipment entry from femto base station 30. That signal is received by reception equipment 600 and is then passed to user equipment entry reception logic 630. That step is indicated thus step 710 of method 700 illustrated by FIG. 7. The femto gateway acts to store the relevant received user equipment entry information. The act of storage is indicated as step 720.

The indication of user equipment entry transmitted by a femto base station is stored in user equipment entry storage logic 640. Reception equipment 600 of femto gateway 230 is also operable to receive an indicator of a femto base station detected by user equipment. That step is indicated as step 730. It will be understood that the indicator of detected femto base stations originates at the user equipment, and in particular is likely to arrive at the femto gateway as a handover message from the core network.

The user equipment will have effectively identified a femto base station for potential handover, by listing a received signal from a femto base station in a candidate list sent to a macro base station.

Femto gateway 230 acts to correlate the base station indicator and the stored user equipment entry information as indicated by step 740. It will be understood that the femto gateway 230 is operable to identify those femto base stations to which the core network wishes to handover and those femto base stations which have recently had user equipment enter the geographical region served by themselves. By correlating those two pieces of information, the femto gateway 230 can limit the number of identified target handover base stations to the most likely base stations and thereby limit unnecessary signally within the system. The step of identifying by correlating is indicated as step 750. It will be understood that once handover targets have been identified at step 750, handover implementation logic 670 and transmission equipment 610 operate to effect the sending of a handover control message to the relevant femto base stations.

Figure 8:
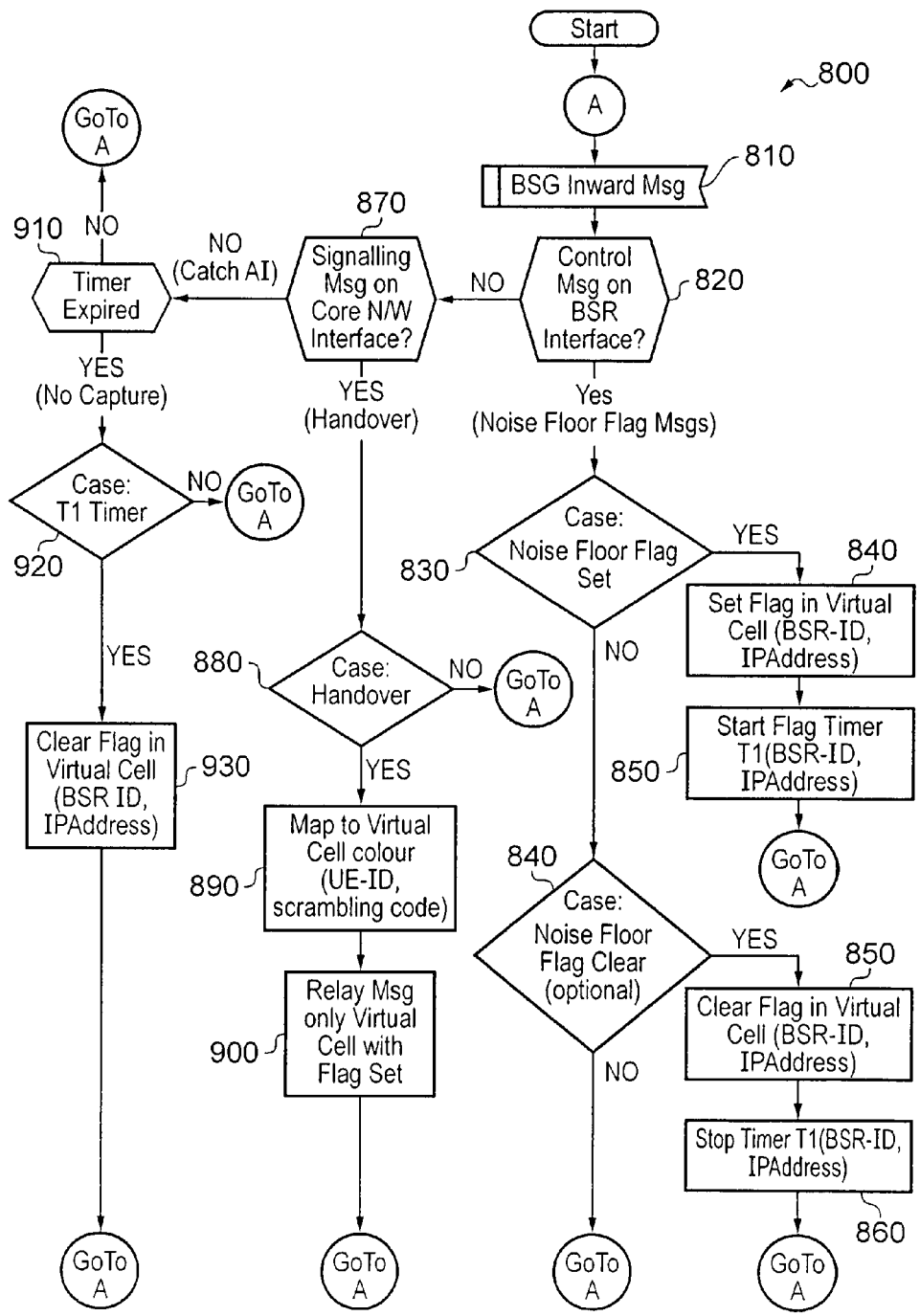
FIG. 8 illustrates a particular embodiment of processing steps performed by a femto gateway for use in the telecommunications network of FIG. 1.

FIG. 8 illustrates a particular embodiment of the processing steps performed by a femto gateway for use in a telecommunications network as shown in FIG. 1. In particular, the processing steps of FIG. 8 illustrate a process 800 which utilises a noise floor flag sent by femto base stations 30 (as described in relation to FIG. 5).

In the method 800 illustrated in FIG. 8, femto gateway 230 receives a message at step 810. Femto gateway then determines whether it is a message from a femto base station at step 820. If identified as a message received from a femto base station and the message relates to a flag, then the femto gateway is operable to determine whether the message instructs the setting of a noise floor flag. That step of determining is step 830. In the case that the message sets a noise floor flag, the femto gateway 230 acts to set a flag in a virtual cell which maps to a particular base station, as illustrated in step 840. The gateway then starts a flag timer at step 850, which operates to check whether that flag needs to be maintained.

At step 830, if it is determined that the message is not to set a noise floor flag, then the femto gateway 230 may be operable (as illustrated at step 840) to clear the noise floor flag. The femto gateway may be operable to clear the flag in a virtual cell mapping to a particular femto base station identification as illustrated at step 850 and stop the relevant timer set at step 850 as illustrated at step 860. If it determines that a 'clear flag' message has been received at step 840.

Returning now to step 820, if the femto gateway receives a control message and has determined that it is not a message received from a femto base station, the gateway is operable to determine whether the message is a signalling message received from the core network. That step is illustrated as step 870. If the message is a signalling message from the core network, the femto gateway then operates to determine whether the signalling message is a handover request message. That step is illustrated as 880. If is it not a handover message, the process simply begins again as illustrated by FIG. 8. If it is determined to be a handover message, the femto gateway is operable to map that handover request to a virtual cell and does that by looking at the user equipment ID and the primary scrambling code provided from the core network. The step of mapping to a virtual cell is illustrated as step 890.

At step 900, the femto gateway compares the mapping to a virtual cell colour completed at step 890 with those femto base stations that have a flag set indicative of an increase in noise floor (and therefore a recent user entry into the geographical area served by those femto base stations) and relays the handover message only to those femto base stations in the virtual cell having a noise floor flag set.

If the inward message received by the gateway at step 810 is neither a control message received from a femto base station nor a signalling message from the core network then femto gateway 230 operates according to step 910 and determines whether the timer set at step 850 has yet expired. If the timer has not expired the process begins again. If the timer has expired, the base station operates to clear the flag in the virtual cell as indicated by step 930.

It will be understood that the clearing operations allows only those femto base stations which have recently entered user equipment to maintain a flag. Furthermore, it will be understood that if the system is required to recognise a series of user equipment entries to a particular geographical area served by a femto base station, the flag clearing operation facilitates this. For example, the entry of a first active user equipment into a geographical region served by a base station 30 will cause a noise floor threshold trigger condition 230 be met and consequently a flag to be set. If that user equipment remains active and remains in femto cell 32 the ambient noise floor will be recalculated and eventually the flag will be cleared. If a second active user equipment enters the same geographical region, it is necessary to reset the noise floor flag and the trigger condition is done by comparison with the newly calculated ambient noise floor.

Figure 9:
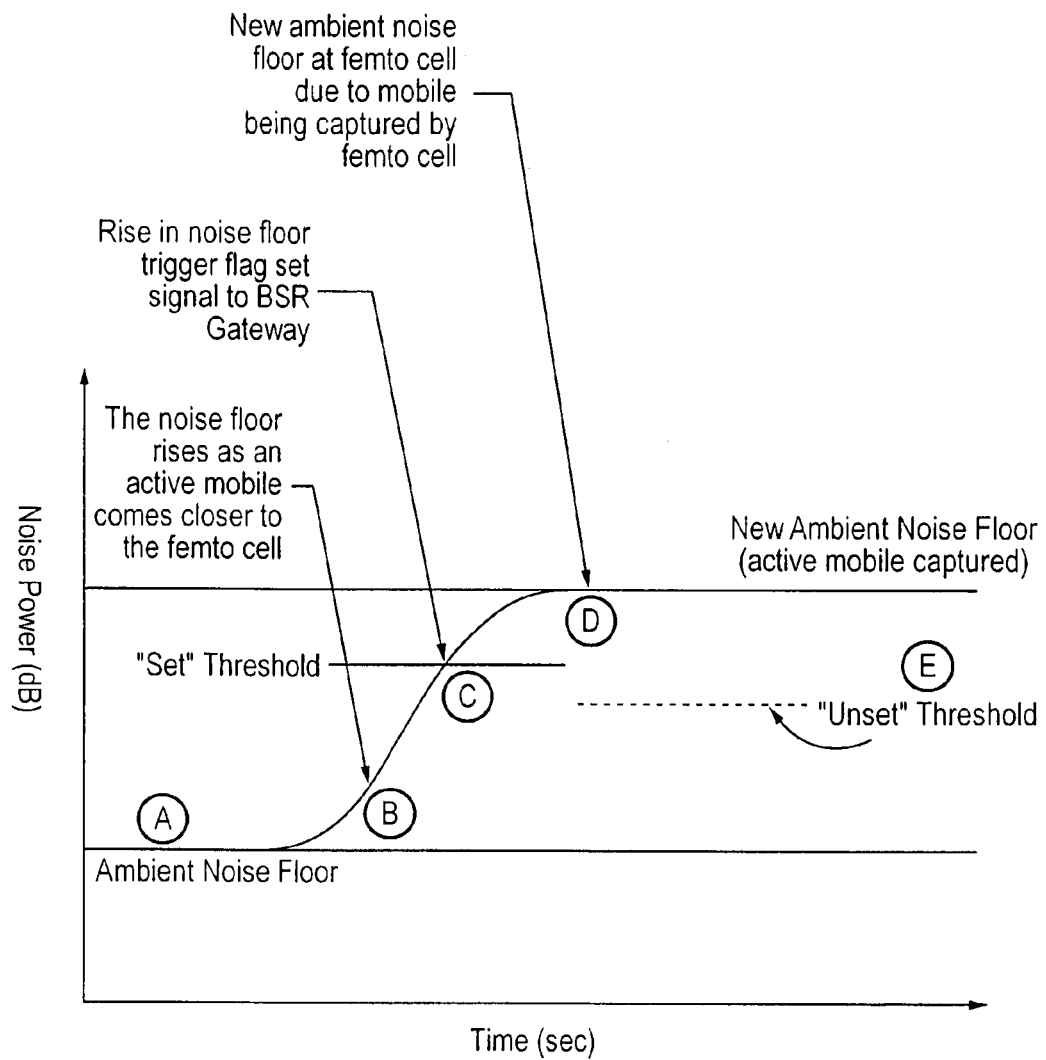
FIG. 9 illustrates schematically radio condition trigger conditions according to one embodiment.

FIG. 9 illustrates a particular example of a radio condition trigger event. In this case the trigger event is an increase in noise floor measured by a femto base station. The graph of FIG. 9 illustrates measured noise floor at the femto base station as an active user equipment enters the geographical region served by that particular femto base station. At A the femto base station is experiencing a substantially flat ambient noise floor. At B, an active mobile comes closer to the femto base station and enters the femto cell. At C the femto base station recognises that the noise floor measured has reached a set of conditions associated with a 'set' threshold. Conditions indicating that active user equipment has entered the femto cell have been met. At C the rise in noise floor triggers a 'flag set' signal to be sent to a femto gateway. At D it can be seen that a new substantially steady ambient noise floor has been set this increase in overall noise is due to the active mobile being captured by the femto cell. Eventually, the periodic check implemented at the femto gateway will clear the set flag. It can also be seen that if the noise floor falls below level 'E' before that process a 'clear flag' message may be sent to a femto gateway.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of identifying, at a femto gateway, femto base station handover targets for user equipment in a wireless telecommunications network, said method comprising:
    receiving, at the femto gateway, an indication of user equipment entry into a geographical area served by a femto base station;
    storing user equipment entry information, by setting a flag for those femto base stations for which the indication of user equipment entry has been received;
    receiving, at the femto gateway, an indicator from user equipment identifying a detected femto base station as a handover target;
    correlating, at the femto gateway, said indicator against said set flags to identify only those femto base stations having set flags as handover targets; and
    transmitting a handover prepare message only to those femto base stations identified as handover targets.

2. The method according to claim 1, wherein said indicator from user equipment comprises a primary scrambling code, said method further comprising:
    identifying a set of femto base stations comprising a virtual cell corresponding to said primary scrambling code.

3. The method according to claim 1, wherein said indication of user equipment entry into a geographical area served by a femto base station comprises an indication of increased radio noise floor detected by a femto base station.

4. The method according to claim 1, wherein said stored user equipment entry information comprises a list of flags identifying those femto base stations reporting user equipment entry.

5. The method according to claim 1, further comprising:
    receiving an indication of user equipment entry into a geographical area served by a femto base station; and
    storing user equipment entry information, by setting a flap for those femto base stations for which said indication of user equipment entry has been received;
    wherein the receiving of the indication and the storing of the user equipment entry information are periodically repeated.

6. A non-transitory computer-readable medium storing program instructions that, when executed on a computer, cause a corresponding computer-controlled femto gateway to perform the method of claim 1.

7. A femto gateway operable to identify femto base station handover targets for user equipment in a wireless telecommunications network, said femto gateway comprising:
    a user equipment entry reception logic configured to receive an indication of user equipment entry into a geographical area served by a femto base station;
    a user equipment entry storage logic configured to store user equipment entry information, by setting a flag for those base stations for which said indication of user equipment entry has been received;
    a handover target reception logic configured to receive an indicator from user equipment identifying a detected femto base station as a handover target;
    a handover correlation logic configured to correlate said indicator against said set flags to identify only those femto base stations having set flags as handover targets; and
    a transmission logic configured to transmit a handover prepare message only to those femto base stations identified as handover targets.

8. The femto gateway according to claim 7, wherein the indicator from user equipment includes a primary scrambling code;
    wherein the femto gateway is configured to identify a set of femto base stations forming a virtual cell and corresponding to the primary scrambling code.

9. The femto gateway according to claim 7, wherein the indication of user equipment entry into a geographical area served by a femto base station includes an indication of increased radio noise floor detected by a femto base station.

10. The femto gateway according to claim 7, wherein the femto gateway is configured to receive an indication of user equipment entry into a geographical area served by a femto base station;
    wherein the femto gateway is configured to store user equipment entry information by setting a flag for those femto base stations for which the indication of user equipment entry has been received;
    wherein the femto gateway is configured to periodically repeat the receiving of the indication and the storing of the user equipment entry information.

11. A method of identifying, at a femto base station, entry of user equipment into a geographical area served by the femto base station to a femto gateway in a wireless telecommunications network, said method comprising:
    receiving, at the femto base station, an indication of a measurable characteristic representative of ambient radio condition at said femto base station;
    receiving, at the femto base station, an indication of a measurable characteristic representative of current radio condition at said femto base station;
    comparing said indication of current radio condition to said indication of ambient radio condition to determine whether a predetermined user equipment entry trigger condition has been met; and
    transmitting an indication of user equipment entry to said femto gateway if said user equipment entry trigger condition has been met at the femto base station.

12. The method according to claim 11, wherein said characteristic of radio condition comprises an indication of radio noise floor detected by said femto base station.

13. The method according to claim 11, further comprising:
    periodically receiving an indication representative of current radio condition;
    storing a series of said indications representative of current radio condition; and
    calculating said indication characteristic of ambient radio condition from said series of said indications representative of current radio condition.

14. The method according to claim 11, further comprising:
    receiving an indication of a measurable characteristic representative of ambient radio condition between said femto base station and said user equipment;
    receiving an indication of a measurable characteristic representative of current radio condition between said femto base station and said user equipment; and
    comparing said indication of current radio condition to said indication of ambient radio condition to determine whether a predetermined user equipment entry trigger condition has been met;
    wherein the receiving of the indications associated with the ambient and current radio conditions and the comparing of the indications are periodically repeated.

15. The method according to claim 11, further comprising:
    transmitting an indication of non-user equipment entry to said femto gateway if said user equipment entry trigger condition has not been met.

16. A non-transitory computer-readable medium storing program instructions that, when executed on a computer, cause a corresponding computer-controlled femto base station to perform the method of claim 11.

17. A femto base station operable to identify entry of user equipment into a geographical area served by a femto base station to a femto gateway in a wireless telecommunications network, said femto base station comprising:
    an ambient radio condition reception logic configured to receive an indication of a measurable characteristic representative of ambient radio condition at said femto base station;
    a current radio condition reception logic configured to receive an indication of a measurable characteristic representative of current radio condition at said femto base station;
    a radio condition comparison logic configured to compare said indication of current radio condition to said indication of ambient radio condition to determine whether a predetermined user equipment entry trigger condition has been met; and
    a transmission logic configured to transmit an indication of user equipment entry to said femto gateway if said user equipment entry trigger condition has been met at said femto base station.

18. The femto base station according to claim 17, wherein the characteristic of radio condition includes an indication of radio noise floor detected by the femto base station.

19. The femto base station according to claim 17, wherein the femto base station is configured to periodically receive an indication representative of current radio condition;
    wherein the femto base station is configured to store a series of the indications representative of current radio condition;
    wherein the femto base station is configured to calculate the indication characteristic of ambient radio condition from the series of the indications representative of current radio condition.

20. The femto base station according to claim 17, wherein the femto base station is configured to receive an indication of a measurable characteristic representative of ambient radio condition between the femto base station and the user equipment;
    wherein the femto base station is configured to receive an indication of a measurable characteristic representative of current radio condition between the femto base station and the user equipment;
    wherein the femto base station is configured to compare the indication of current radio condition to the indication of ambient radio condition to determine whether a predetermined user equipment entry trigger condition has been met;
    wherein the femto base station is configured to periodically repeat the receiving of the indications associated with the ambient and current radio conditions and the comparing of the indications.

\* \* \* \* \*